W. LEPPERT.
EXTENSION TOP FOR VEHICLES.
APPLICATION FILED APR. 1, 1908.
914,961.
Patented Mar. 9, 1909.
2 SHEETS—SHEET 1.
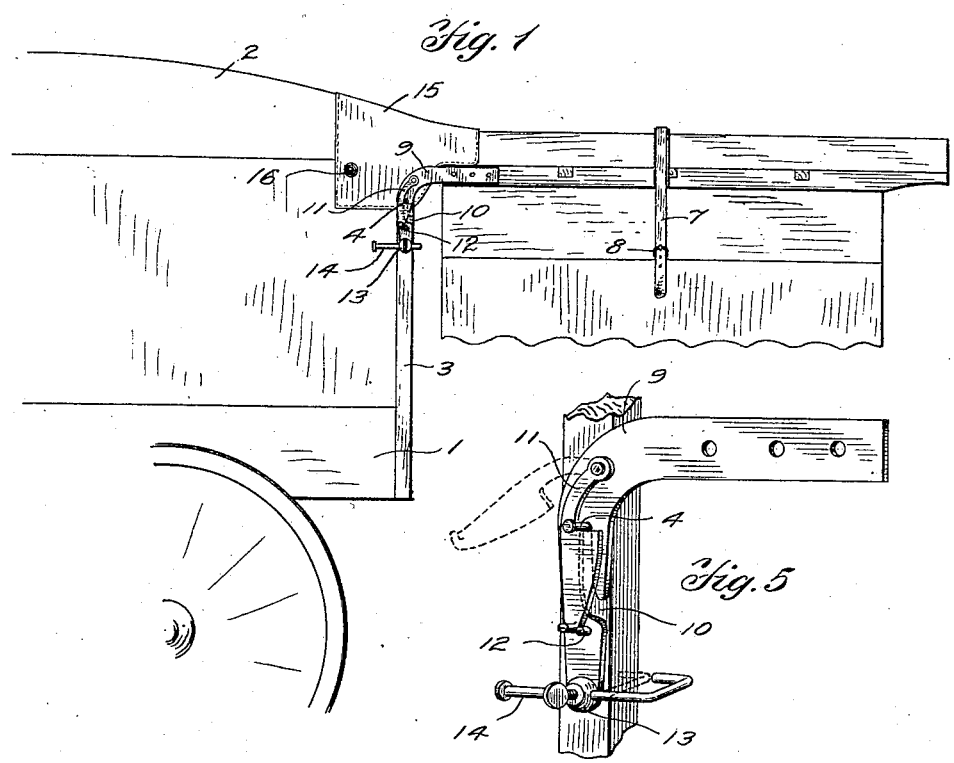
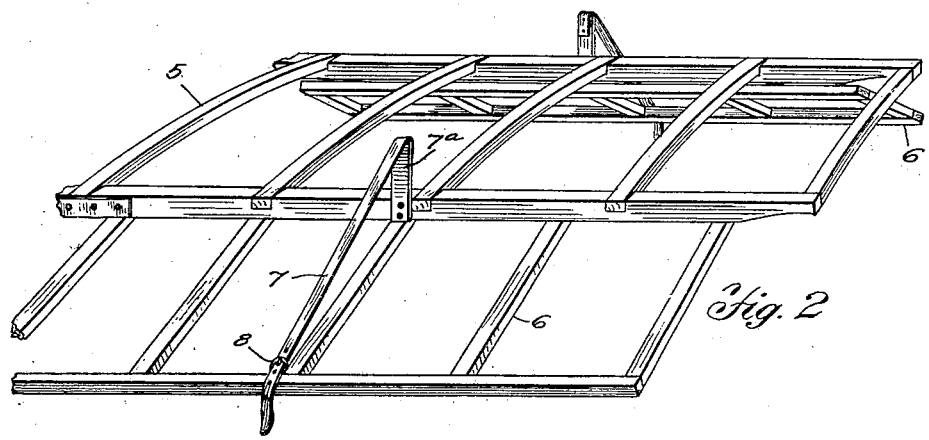
Witnesses
R. C. Claflin
W. H. Small
Inventor
William Leppert
By Edson Bros,
Attorneys

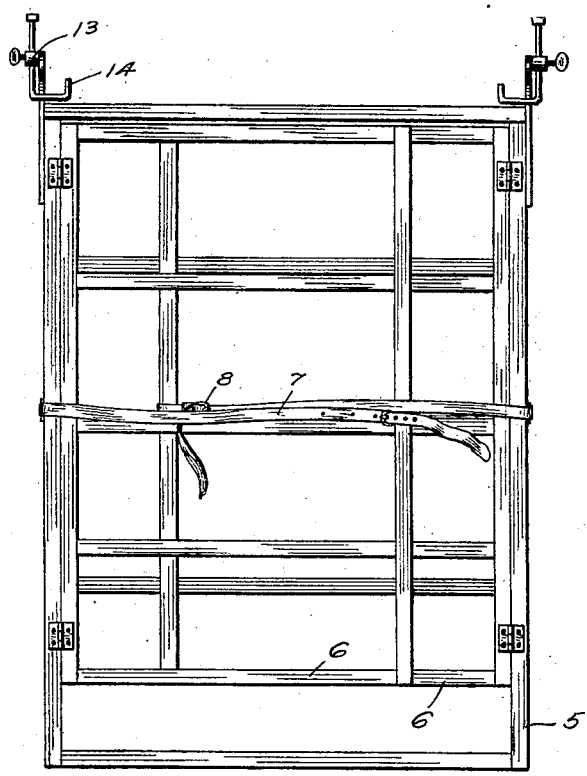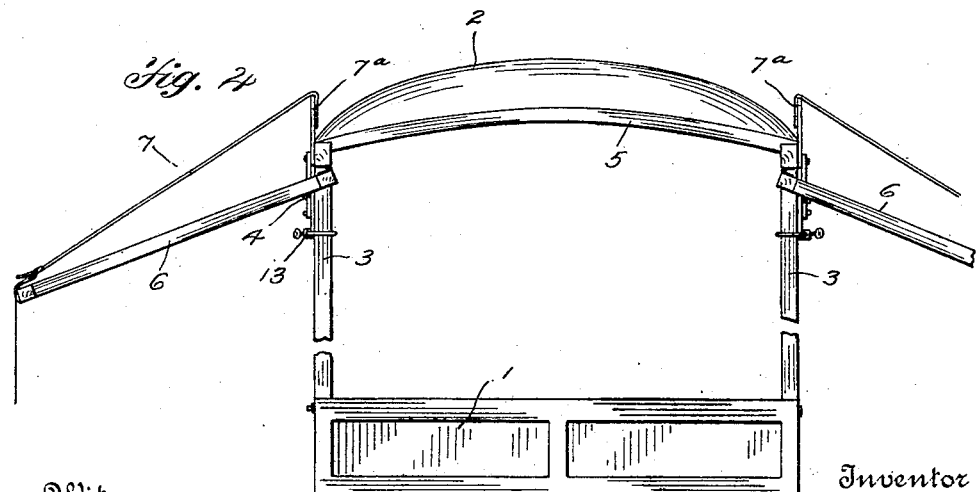

UNITED STATES PATENT OFFICE.

WILLIAM LEPPERT, OF JUNCTION CITY, OREGON.

EXTENSION-TOP FOR VEHICLES.

No. 914,961.　　　Specification of Letters Patent.　　　Patented March 9, 1909.

Application filed April 1, 1908. Serial No. 424,556.

*To all whom it may concern:*

Be it known that I, WILLIAM LEPPERT, a citizen of the United States, residing at Junction City, in the county of Lane and State of Oregon, have invented certain new and useful Improvements in Extension-Tops for Vehicles; and I do hereby declare the following to be a full, clear, and exact description of the invention, such as will enable others skilled in the art to which it appertains to make and use the same.

My invention relates to improvements in wagon tops and particularly to extension tops for use especially on market wagons and other vehicles for the purpose of providing a shelter in the rear of the wagon.

Among the objects of the invention are to simplify the construction of the extension top and the means for securing it to the wagon top whereby it may be quickly adjusted and removed and may be folded to occupy a very small space when not in use.

Another object of the invention is to provide an extension top which can be attached to any wagon top without first modifying the construction of said wagon top to accommodate it.

The invention contemplates the construction of a light frame or extension top having means at one end for connecting it quickly and securely to the rear end of a wagon top. The invention consists further in providing means for adjusting said extension top at various angles with respect to the wagon top.

The invention also consists in the features of construction and combinations of parts hereinafter described and specified in the claims.

In the accompanying drawings illustrating the preferred embodiment of my invention: Figure 1 is a side elevation of a wagon body and top showing an extension top constructed in accordance with my present invention secured to said wagon top. Fig. 2 is a perspective view of the extension top with the covering removed. Fig. 3 is a detail view of the extension top folded as when not in use. Fig. 4 is a rear end view of the wagon body and top, and Fig. 5 is an enlarged detailed view showing the means of connection between the extension and main tops more clearly.

Referring more particularly to the drawings, 1 designates an ordinary market wagon body equipped with the usual form of top 2, the rear end of said top being supported upon uprights 3 forming a part of the rear bow of the top. On each of said uprights there is fastened a lug 4 extending outwardly and preferably headed at its end.

The extension top comprises a main frame 5 preferably constructed of light material. To each side of said frame there is hinged an awning frame 6 adapted to be extended laterally and to be adjustably held in position by means of a strap 7 secured to one of the side bars of the main frame and engaging a buckle 8 mounted on the outer side bar of said awning frame. Said strap is preferably secured to an upwardly extending strip $7^a$ of metal or other rigid material whereby the inner end of said strap is raised above the plane of the main frame of the extension top and the strap is therefore better able to support the awning.

Angular or bent metal brackets 9 are secured to the side bars of the extension top frame and project forwardly and downwardly therefrom. The bent or downwardly extending portion of each of said brackets is provided near its upper end with a slot or way 10 which is adapted to engage one of the lugs on the rear end of the wagon top. A hook 11 is pivoted on the bracket and is adapted to engage said lug and retain it in the slot 10. A stop pin 12 may be employed to arrest the hook when it reaches its operative position. The lower end of the bent portion of said bracket carries a binding post 13 through which is passed a hooked rod 14 which is adapted to engage the rear face of the upright 3 and hold the extension top at a predetermined angle with the wagon top. It will readily be seen that by adjusting the hooked rod in the binding post the angle of said extension top will be changed by moving it upon the lugs 4 as a center or fulcrum.

The frame of the extension top may be covered or trimmed with any suitable waterproof material which is equipped with the forwardly extending apron 15 to cover the space between the extension top and the wagon top and which may be secured to the latter by knobs or buttons 16 engaged by button holes in said apron. It will be readily seen, from the fact that the extension top without its covering only weighs twenty-five pounds, that it can be easily handled and because of the simplicity of the attaching means it can be very quickly adjusted in place or removed. It is only necessary to secure the lugs 4 to the uprights of the rear bow of any wagon top in order that my extension top may be connected thereto.

As shown in Fig. 3 the side awnings of the extension top may be folded below it so that the whole will take up very little space when not in use. Any suitable form of lug may be attached to the uprights of the rear bow of the wagon top for supporting the extension top. A stout nail driven into said uprights might serve the purpose. The form of lug shown in the drawings is, therefore, merely one of a number of constructions which might be employed. Other changes may be made in the construction shown and described herein without departing from the spirit or sacrificing the advantages of my invention.

I claim:

1. The combination with a wagon top having laterally projecting lugs secured thereto, a removable extension top having projecting slotted brackets adapted to engage said lugs and means to retain said lugs in the slots of said brackets.

2. The combination with a wagon top having laterally projecting lugs secured thereto, a removable extension top having projecting slotted brackets adapted to engage said lugs, and hooks pivoted to said brackets and adapted to retain said lugs in said slots.

3. The combination with a wagon top having projecting lugs secured thereto, a removable extension top having projecting slotted brackets adapted to engage said lugs and means to support said extension top at a predetermined angle.

4. The combination with a wagon top having projecting lugs secured thereto, a removable extension top having projecting slotted brackets adapted to engage said lugs, and adjustable means for supporting said extension top at different angles.

5. The combination with a wagon top having projecting lugs secured thereto, an extension top having projecting slotted brackets adapted to engage said lugs and adjustable hooked rods on the ends of said brackets adapted to engage a part of the frame of said wagon top.

6. The combination with a wagon top having projecting lugs secured thereto, of an extension top having projecting brackets bent at an angle thereto, each of said brackets having a slot adapted to engage one of said lugs and also having an adjustable hooked rod at its end adapted to engage one of the uprights of the rear bow of said wagon top for the purpose specified.

7. The combination with a wagon top having projecting lugs secured thereto, of an extension top having projecting brackets bent at an angle thereto, each of said brackets having a slot adapted to engage one of said lugs and also having an adjustable hooked rod at its end adapted to engage one of the uprights of the rear bow of said wagon top for the purpose specified, each of said brackets also carrying a hook to retain the lug in its slot.

8. The combination, with a wagon top having projecting lugs secured thereto, an extension top having projecting slotted brackets adapted to engage said lugs and adjustable hooked rods on the ends of said brackets adapted to engage a part of the frame of said wagon top, each of said brackets also carrying a hook to retain the lug in its slot, and means to limit the movement of said hooks across said slots.

In testimony whereof, I affix my signature, in presence of two witnesses.

WILLIAM LEPPERT.

Witnesses:
W. C. WASHBURNE,
F. W. MOORHEAD.